Patented Aug. 29, 1939

2,171,140

UNITED STATES PATENT OFFICE 2,171,140

PRESSURE SENSITIVE ADHESIVE SHEET

Ralph T. K. Cornwell, Spotsylvania, Va., assignor to Sylvania Industrial Corporation, Fredericksburg, Va., a corporation of Virginia No Drawing. Application August 1, 1936, Serial No. 93,790

4 Claims. (Cl. 91—68)

The invention relates to a composition of matter, especially one containing rubber. More particularly it relates to an adhesive material and pertains to normally tacky, pressure sensitive adhesive materials and to rubber adhesive compositions that may be utilized in the production thereof.

Heretofore, attempts have been made to produce pressure sensitive adhesive sheets by directly applying a coating of a normally tacky rubber adhesive to a pellicle of an organic hydrophilic colloidal gel, such as Cellophane. The product derived from this process has not measured up to the required standards mainly because a satisfactory bond between the adhesive and the backing sheet could not be effected. The hydrophilic colloidal gel serving as the backing is characterized by having a dense, smooth, non-porous surface which is wetted and swelled by water but not wetted by the water-immiscible organic solvents normally employed for swelling or dissolving rubber and resins. The rubber adhesive employed is a hydrophobic colloidal gel containing organic compounds not wetted by water, whereas the water-immiscible organic solvents which wet such a gel do not function as softening agents for the hydrophilic colloidal gel forming the backing. Due to the unlike characteristics of the two colloids, which exhibit no adherent attraction or absorption for each other, a proper union of the same could not be effected.

A general object of the invention is to obviate the foregoing and like disadvantages characterizing the heretofore known products.

A specific object of the invention is to provide a preferential adherence of an adhesive hydrophobic colloidal gel with respect to a pellicle formed of a hydrophilic colloidal gel.

It is also an object of the invention to provide a coating process whereby a pressure-adherent sheet, band or tape having a plurality of coatings is made in a single coating operation.

An additional object of the invention is to provide a composition of matter having a rubber base which on deposition will yield a stratified coating.

Other objects of the invention will in part be obvious and will in part appear hereinafter.

According to the invention, there is provided a composition comprising rubber, a resin, an agglutinant hydro-gel, water and a water-immiscible solvent for the resin, the composition adapted to form, on deposition, a normally tacky adhesive having a strong adherent affinity for hydrophilic colloidal gels. The invention also comprises the process of applying the novel composition to a pellicle composed of a hydrophilic colloidal gel, and the product of this process.

The invention accordingly comprises the process having the several features and the relation of one or more of such features with respect to each of the others, a novel composition and product possessing the characteristics, properties and the relation of constituents, which are exemplified in the following detailed disclosure, and the scope of the invention will be indicated in the claims.

In the practice of the invention the backing material is suitably composed of a water-insoluble hydrophilic colloidal gel, such as non-fibrous cellulose hydrate and alkali-soluble cellulose ethers, also gelatine which has been insolubilized by treatment with dichromates or formaldehyde or other suitable agents, etc., or any appropriate combinations of these or like materials. The backing materials may be transparent, translucent or opaque and/or colored and may carry a moistureproof coating on the side not covered by the adhesive coating.

The adhesive composition in general comprises a hydrophobic colloidal gel such as rubber, a resin and/or a plasticizer, a water-immiscible organic solvent for the resin, a water-soluble hydrogel such as gelatine, glue, dextrine, casein, or the like, adapted to form an agglutinant, and an aqueous solvent for the hydrogel.

While any form of rubber may be employed, such as artificial dispersions or solutions of natural or synthetic rubber, it is preferable to employ latex as the rubber constituent.

As a resin, use is preferably made of ester gum, but satisfactory results may be obtained with high grade gum dammar, mastic, cumar and rosin, these being referred to hereinafter collectively under the generic term "resin".

For the plasticizer there may be employed "Paraplex" which is a condensation product of glycerol and sebacic acid. Other soft resins and nondrying oils such as castor oil may be used as the plasticizer.

I have found that the adherent affinity of an adhesive hydrophobic colloidal gel with respect to a backing material composed of a hydrophilic colloidal gel may be greatly enhanced by providing an intermediate coating of a suitable agglutinant hydrogel between the adhesive layer and the backing material, the hydrogel having an excellent adherent affinity for both the adhesive and its backing material. The intermediate coating comprises a water-soluble organic hydrogel, such, for example, as gelatine, glue, dextrine, casein, or the like. These hydrogels are characterized by dissolving in warm water to form an agglutinant. They distinguish in this property from the organic hydrophilic colloidal gels, such as non-fibrous cellulose hydrate, which do not dissolve in water and which do not become tacky when wetted by water. Agglutinant hydrogels of this character have been found to have a great adherent affinity for the hydrophilic colloidal gels serving as the backing and for the hydrophobic colloidal gels forming the adhesive coating.

The preferential adherence is obtained only by compounding the several ingredients of the adhesive composition in a particular fluid medium and in applying the composition in a novel manner hereinafter disclosed. According to this invention the adhesive composition is made up in two solutions. Solution "A" comprises the resin and plasticizer dispersed and/or dissolved in a solvent which is immiscible with water, such as benzene, toluene or the like. This solvent may be a single water-immiscible organic liquid or a mixture of such a liquid with a water-miscible liquid in such proportion that the solvent mixture is water-immiscible. Solution "B" comprises the water-soluble hydrogel and the rubber, preferably in the form of latex, dispersed and/or dissolved in water and water-miscible solvents. It is essential that the fluid dispersion agents used for Solution A should be immiscible with those used in Solution B.

Solutions A and B are now stirred together vigorously until a substantially uniform dispersion is obtained. Preferably, Solution A is stirred into Solution B. It is advantageous to add a small amount, such as 5%, of a suitable dispersion agent such as triethanolamine to stabilize the dispersion.

The above disclosed composition will be sufficiently fluid to be readily applied to the backing material by direct coating methods, such, for example, as by passing a sheet or web over a coating roll or under a doctor blade. The coated material may then be passed through a suitable drying chamber wherein the solvents and water are evaporated, preferably at an elevated temperature.

During the coating process the agglutinant hydrogel separates into a layer and adheres directly to the backing sheet. The balance of the solids in the composition form an exterior layer which firmly adheres to the deposited hydrogel. It may thus be seen that by applying the novel composition to a pellicle composed of a hydrophilic colloidal gel and evaporating the solvents, a stratified coating results in which there are at least two substantially distinct layers. The intermediate layer of the agglutinant hydrogel is formed in situ and serves to firmly bind the adhesive hydrophobic colloidal gel to the backing which is composed of a hydrophilic colloidal gel.

The constituents are so proportioned that the adhesive layer resulting upon evaporation of the solvents will be composed of approximately:

| | Percent |
|---|---|
| Rubber | 55 |
| Resin | 25 |
| Softener | 20 |

While the above composition illustrates the preferred embodiment, it is within the purview of the invention to suitably proportion the rubber, resin and/or softener so as to obtain an adhesive layer having the desired properties. The amount of the agglutinant hydrogel added should be about 3% to 10% by weight (dry basis) based on the total solids in the dispersion of "A" and "B".

The pressure sensitive adhesive sheet material of the invention may be applied to and stripped from any surface without the transfer of any adhesive from the sheet material to the surface.

In addition to its use in the production of conventional type adhesive tapes, bands and sheets, the novel composition may be applied to both sides of a sheet material for use in laminating sheet materials, veneering and in the fabrication of shoes, rugs, floor coverings and other articles of manufacture.

It will thus be seen that by means of the present invention there have been provided novel compositions having improved and technically important properties which may be economically and easily prepared and used, and since certain changes may be made in the above mentioned products and different embodiments of the invention could be made without departing from the scope thereof, it is intended that all matter contained in the above description shall be interpreted as illustrative and not in a limiting sense. It is also to be understood that, in the claims, ingredients recited in the singular are intended to include compatible mixtures of such ingredients wherever the sense permits.

Having described my invention, what I claim as new and desire to secure by Letters Patent is:

1. As an article of manufacture, an adhesive material comprising a pellicle composed of a substance selected from the class consisting of non-fibrous cellulose hydrate, alkali-soluble cellulose ethers and insolubilized gelatine and having a pressure-sensitive rubber adhesive coating thereon and an intermediate coating of a water-soluble agglutinant substance selected from the class consisting of gelatine, glue, dextrine and casein, said agglutinant being in the form of a hydrogel simultaneously formed in situ with the rubber coating.

2. As an article of manufacture, an adhesive material comprising a pellicle of non-fibrous cellulose hydrate having a pressure-sensitive rubber adhesive thereon and an intermediate coating of a gelatine hydrogel simultaneously formed in situ with the rubber coating and having an adherent affinity for both the cellophane and the adhesive.

3. As an article of manufacture, a pressure-sensitive adhesive material comprising a pellicle of non-fibrous cellulose hydrate having a coating of a substance selected from the class consisting of gelatine, glue, dextrine and casein, and a second coating over the first comprising a normally tacky rubber-resin mixture, the two coatings being simultaneously deposited in situ.

4. A process of producing a pressure-sensitive adhesive material, which comprises coating a carrier pellicle composed of a substance selected from the class consisting of non-fibrous cellulose hydrate, alkali-soluble cellulose ethers and insolubilized gelatine with an aqueous disperson of latex, a water-soluble agglutinant hydrogel selected from the class consisting of gelatine, glue, dextrine and casein; a resin and a water-immiscible solvent for the resin, and drying the composition to form two layers simultaneously, the lower comprising a tacky hydrogel and the upper a normally tacky mixture of rubber and resin.

RALPH T. K. CORNWELL.